(12) United States Patent
Wang

(10) Patent No.: US 12,168,493 B2
(45) Date of Patent: Dec. 17, 2024

(54) LOCKING ARM OF A CARRIER CONNECTING ROD AND METHOD FOR MAKING THE SAME

(71) Applicant: KING RACK INDUSTRIAL CO., LTD., Taichung (TW)

(72) Inventor: Chiu Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/368,530

(22) Filed: Sep. 14, 2023

(65) Prior Publication Data
US 2024/0124081 A1 Apr. 18, 2024

(30) Foreign Application Priority Data
Sep. 30, 2022 (TW) .................................. 111137338

(51) Int. Cl.
| | | |
|---|---|---|
| *B62H 3/12* | (2006.01) | |
| *B21D 37/10* | (2006.01) | |
| *B29C 45/14* | (2006.01) | |
| *B60R 9/10* | (2006.01) | |
| *E05B 71/00* | (2006.01) | |
| *F16B 45/02* | (2006.01) | |

(52) U.S. Cl.
CPC .............. *B62H 3/12* (2013.01); *B21D 37/10* (2013.01); *B29C 45/14336* (2013.01); *B60R 9/10* (2013.01); *E05B 71/00* (2013.01); *F16B 45/02* (2013.01)

(58) Field of Classification Search
CPC . B21D 37/10; B62H 3/12; B62H 5/00; B62H 1/00; B62H 3/02; B29C 45/14336; B60R 9/10; B62J 50/00; B62J 11/00; B62J 23/00; F16B 45/02; F16B 45/023; F16B 7/105; F16B 7/10; E05B 71/00
See application file for complete search history.

(56) References Cited

U.S. PATENT DOCUMENTS

| | | | | |
|---|---|---|---|---|
| 6,435,523 | B1 * | 8/2002 | Hilk ....................... | B62K 13/08 |
| | | | | 280/7.11 |
| 6,602,015 | B1 * | 8/2003 | Evans ................... | F16B 45/027 |
| | | | | 403/109.5 |
| 8,038,173 | B2 * | 10/2011 | Canale .................... | A47L 9/244 |
| | | | | 285/303 |
| D798,771 | S  * | 10/2017 | Pomerantz .................. | D12/114 |

(Continued)

*Primary Examiner* — Devin K Barnett
(74) *Attorney, Agent, or Firm* — Ying-Ting Chen; Law Office of Michael Chen

(57) ABSTRACT

A method for manufacturing a locking arm of a carrier connecting rod includes four steps to press a metal sheet via a first stamping die and a second stamping die to form the metal sheet to include a front section, a bent middle section and a rear section. A stopper is formed to the front section, and a recessed area is formed to one side of the bent middle section. A positioning hole is defined through a center of the recessed area. A guide surface is formed to the bent middle section opposite to the recessed area. The locking arm is pivotably connected to the extendable tube of the carrier connecting rod, and the protrusion of the spring member in the extendable tube is guided by the guide surface to be retractably engaged with the positioning hole. The locking arm is manufactured at low cost and has better structural strength.

3 Claims, 12 Drawing Sheets

(56) References Cited

U.S. PATENT DOCUMENTS

| | | | | |
|---|---|---|---|---|
| 11,453,344 | B2* | 9/2022 | Liu | F16B 45/023 |
| 2002/0043085 | A1* | 4/2002 | Huang | B62H 5/00 |
| | | | | 70/233 |
| 2002/0192015 | A1* | 12/2002 | Wang | B62K 3/04 |
| | | | | 403/109.5 |
| 2008/0221569 | A1* | 9/2008 | Moore | A61B 17/1764 |
| | | | | 606/53 |
| 2012/0112429 | A1* | 5/2012 | Wang | B62K 19/18 |
| | | | | 280/281.1 |
| 2017/0341696 | A1* | 11/2017 | Wang | B62J 23/00 |
| 2021/0331756 | A1* | 10/2021 | Wang | B62K 13/08 |
| 2023/0001859 | A1* | 1/2023 | Wang | B60R 9/045 |
| 2023/0001997 | A1* | 1/2023 | Wang | B62H 3/02 |
| 2023/0001999 | A1* | 1/2023 | Wang | B62K 19/24 |

\* cited by examiner

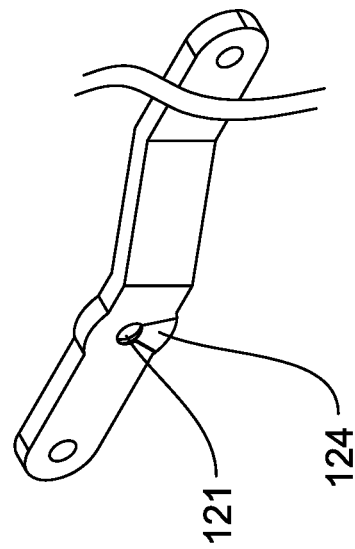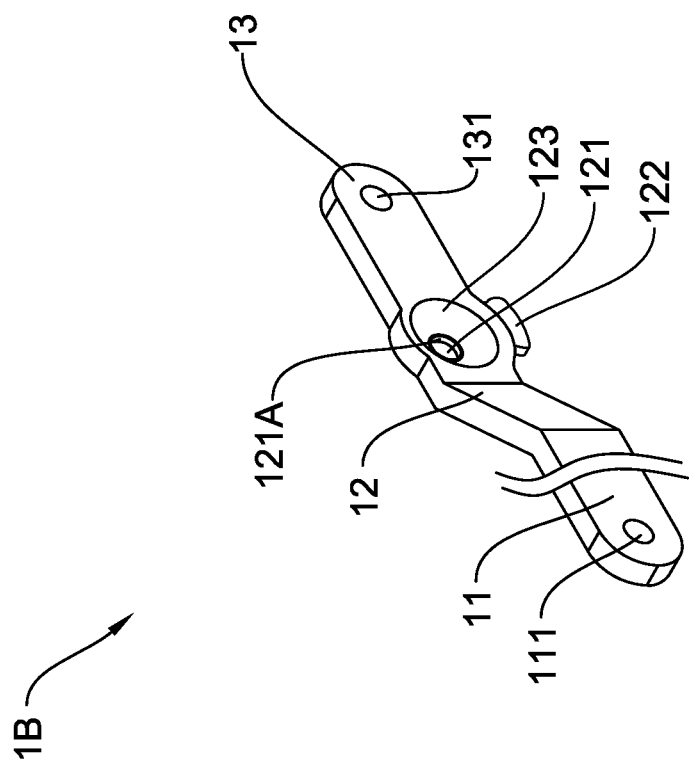

LOCKING ARM OF A CARRIER CONNECTING ROD AND METHOD FOR MAKING THE SAME

FIELD OF THE INVENTION

The present invention relates to a locking arm of a bicycle carrier connecting rod, and a method for making the same.

BACKGROUND OF THE INVENTION

The female bicycle (hereinafter referred to as the "lady bike") lacks a top tube. Therefore, when it needs to be transported using a bike carrier, as shown in FIG. 1, a carrier connecting rod 603 is set between the head tube 601 and the seat tube 602. This allows the lady bike to be connected to the fixed rod of the bike carrier.

As shown in FIG. 2, a clamp-type carrier connecting rod is disclosed. The carrier connecting rod 603 includes an extendable tube 6031, wherein two fixed hooking plates 6032 set in a J-shape at both ends of the extendable tube 6031, and a locking arm 6033 is connected to the fixed hooking plates 6032.

As shown in FIG. 2, when in use, the user needs to adjust the length of the tube 6031, then rotate the locking arm 6033. Place the head tube 601 or the seat tube 602 inside the fixed hooking plate 6032. Finally, push back the locking arm 6033 and use a positioning spring 6034 to position the locking arm 6033.

The above product has been in use for many years and is popular in the market. However, this type of carrier connecting rod 603 has the following shortcomings:

1. The locking arm 6033 is mainly manufactured through mechanical cutting, and the machining operator needs to prepare tools and fixtures for processing, which takes a long time and incurs high costs.
2. The locking arm 6033 has a shape similar to "⌐" and is made of metal. It has perforations 6035 for connecting screws at the pivot end and positioning holes 6036 for securing the positioning spring 6034. Since the perforations 6035 and positioning holes 6036 are located precisely at the bend, continuous vibrations during the transportation of the lady bike can cause shear stress and may lead to fractures along the perforations 6035 or positioning holes 6036.
3. In order to make it easier to press the positioning spring 6034, machining is used at the positioning hole 6036, resulting in a thinner thickness. However, the drawback is the higher cost.

SUMMARY OF THE INVENTION

The first objective of the present invention intends to provide a method for manufacturing the locking arm of a carrier connecting rod, so as to improve the drawbacks of high processing costs and long processing times mentioned above.

Another objective of the present invention is to provide a carrier connecting rod with the locking arm manufactured by the method of the present invention wherein the locking arm of the carrier connecting rod has better structural strength.

The present invention relates to a method for manufacturing a locking arm of a carrier connecting rod, and comprises the following steps:

step S1: preparing a strip of metal sheet;
step S2: placing the metal sheet in a first stamping die which presses the metal sheet to form a first half-finished product, the first half-finished product including a front section, a bent middle section and a rear section, the front section having an aperture, the bent middle section having a positioning hole, and the rear section having a pivotal hole;
step S3: preparing a second stamping die, the second stamping die having a circular groove which is located corresponding to the bent middle section, placing the first half-finished product in the second stamping die and pressing the first half-finished product to form a second half-finished product, the bent middle section being pressed through the circular groove of the second stamping die to form two arc-shaped portions respectively protruding from the upper side and the lower side of the bent middle section, the bent middle section being formed to include a recessed area, the positioning hole being centered formed to the recessed area, an inner periphery of the positioning hole being formed to be a conical positioning hole, a surplus material generated corresponding to the aperture, the positioning hole, and the pivotal hole during the step S2 being deburred, and
step S4: placing the second half-finished product into a plastic mold, injecting plastic to cover the front section and the aperture to form an L-shaped stopper, resulting in the locking arm.

Preferably, the second half-finished product 1B undergoes a surface treatment between the step S3 and the step S4.

Preferably, in the step S2 or the step S3, the first stamping die or the second stamping die includes a part forming a guide surface. The guide surface is located opposite to the recessed area.

The present invention also provides a carrier connecting rod and includes two locking arms each have a stopper formed to the first end thereof. The stopper has a first matching section. Each locking arm includes a pivotal hole defined in the second end thereof, and a positioning hole is defined through a bent middle section of each locking arm. The bent middle section of each locking arm includes a recessed area formed to one of two sides thereof. The positioning hole is located at the center of the recessed area. An extendable tube includes a first bore and a second bore defined through each of two end sections thereof. Two hooking plates are respectively fixed to two ends of the extendable tube, and each of the two hooking plates has a hook end formed to the first end thereof. The hook end has a second matching section formed to its distal end so as to be matched with the first matching section of the stopper of the locking arm corresponding thereto. Each hooking plate has a first pivot extending through the second end thereof. The first pivot extends through the first bore of the extendable tube, the pivotal hole of the locking arm and is connected to a coupling member so that the hooking plate is pivotable about the first pivot relative to the extendable tube. Each hooking plate has a second pivot extending through the second end thereof to fix the hooking plate to the extendable tube. A spring member is located within each of the two ends of the extendable tube and located corresponding to the two locking arms. Each spring member includes a protrusion resiliently extending from the spring member. The protrusion retractably extends through the second bore of the extendable tube and the positioning hole of the locking arm.

Preferably, the locking arm has a guide surface formed opposite to the pressing area. When the locking arm is to be coupled with the protrusion, the protrusion slides along the guide surface.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIGS. 8A and 8B shows the second half-finished product made by the method of the present invention;

DETAILED DESCRIPTION OF THE PREFERRED EMBODIMENT

Figure 1:
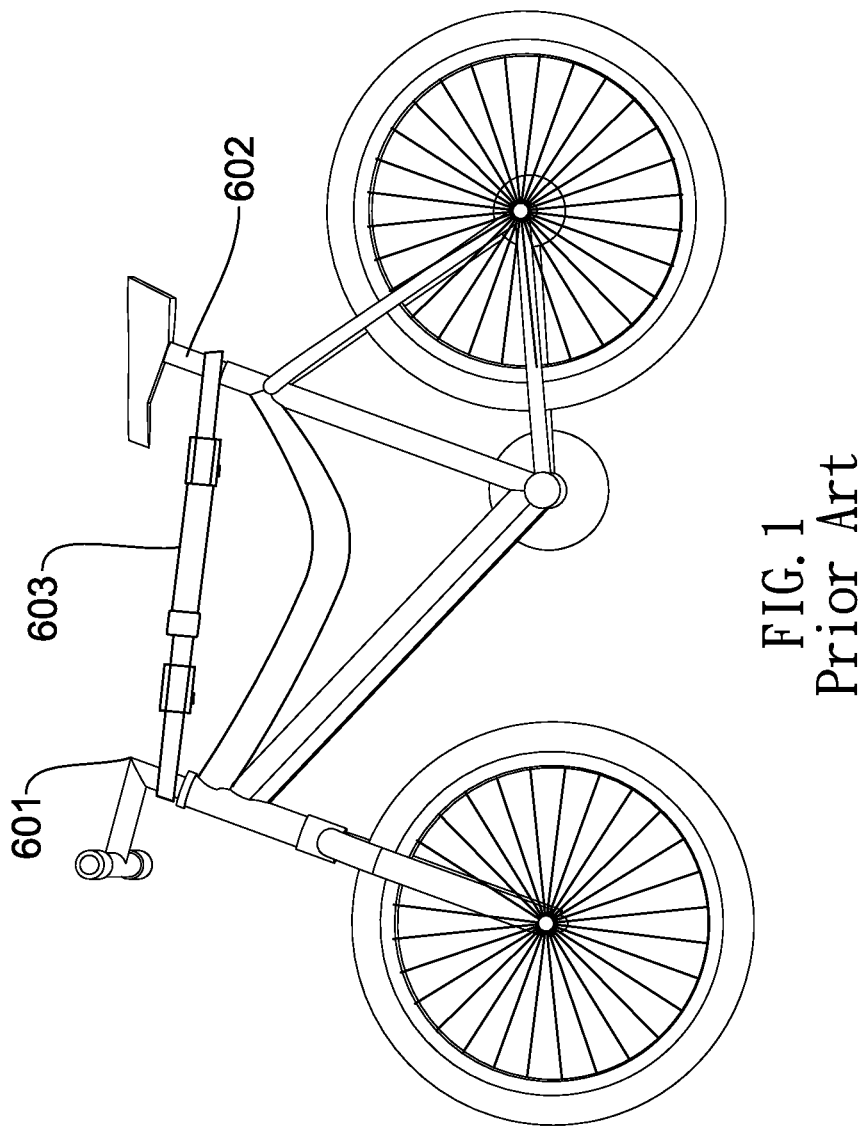
FIG. 1 shows a conventional carrier connecting rod is used to a bicycle.
Figure 2:
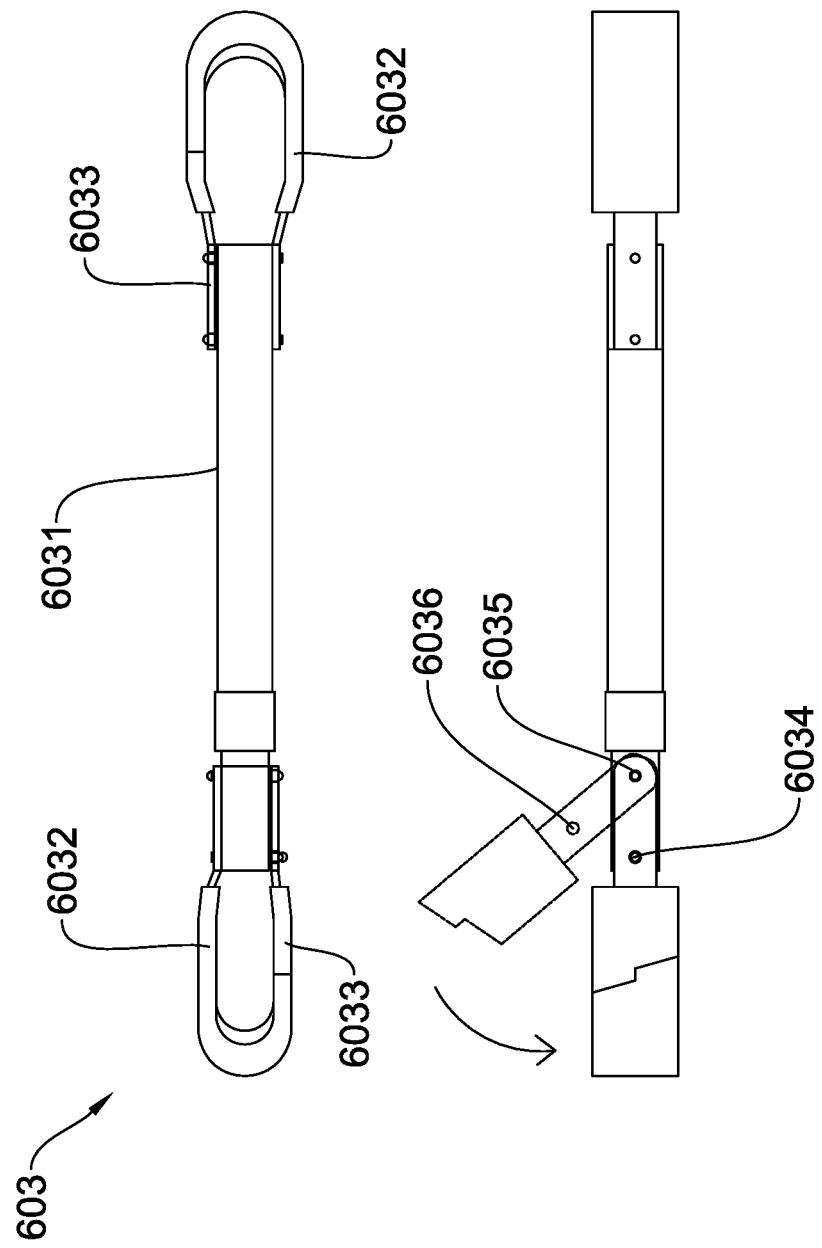
FIG. 2 shows the conventional carrier connecting rod disclosed in FIG. 1.
Figure 3:
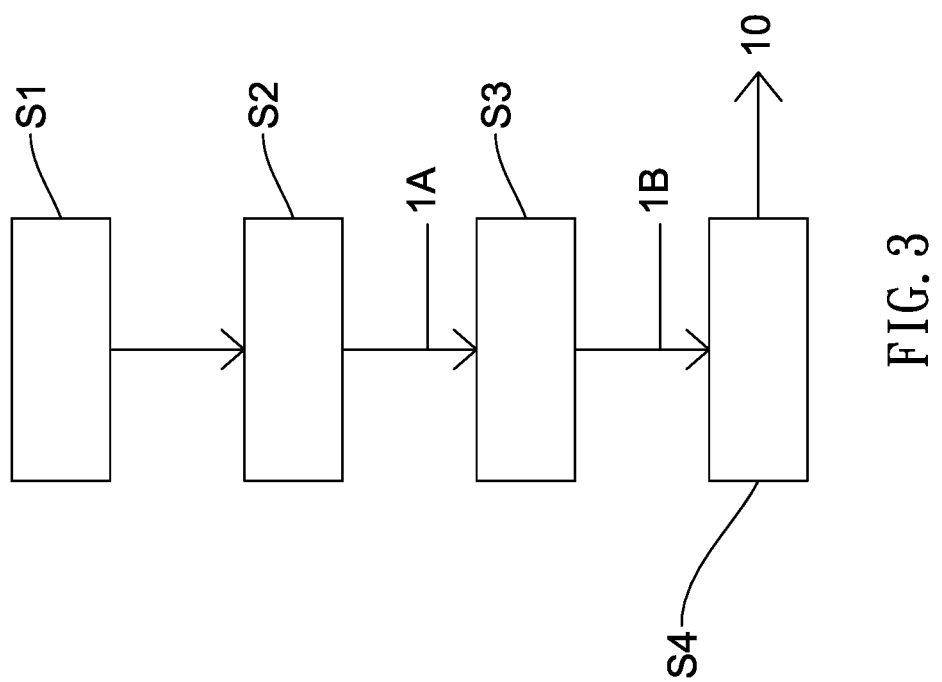
FIG. 3 shows steps of the method of the present invention.
Figure 4:
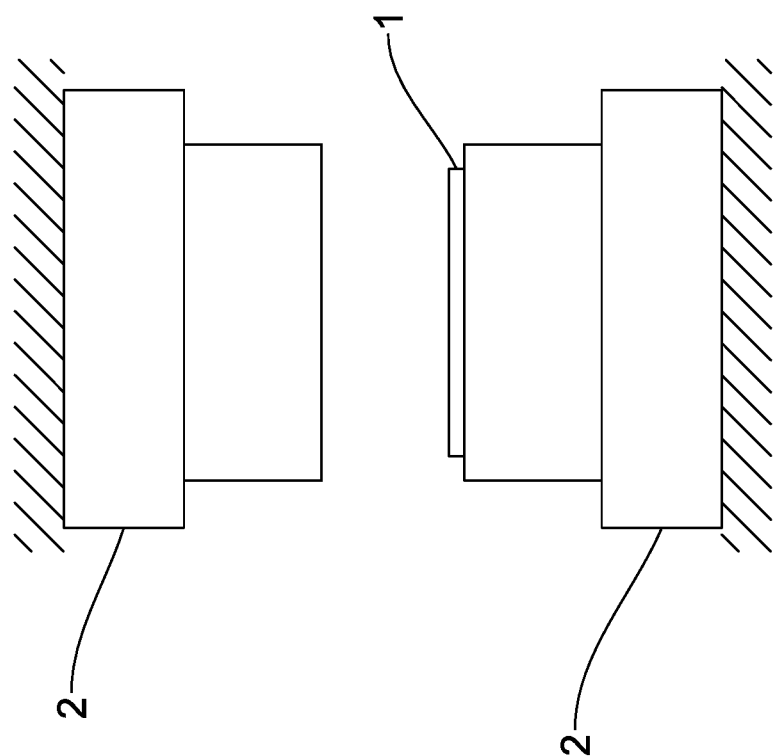
FIG. 4 shows the action of the step 2 of the method of the present invention
Figure 5:
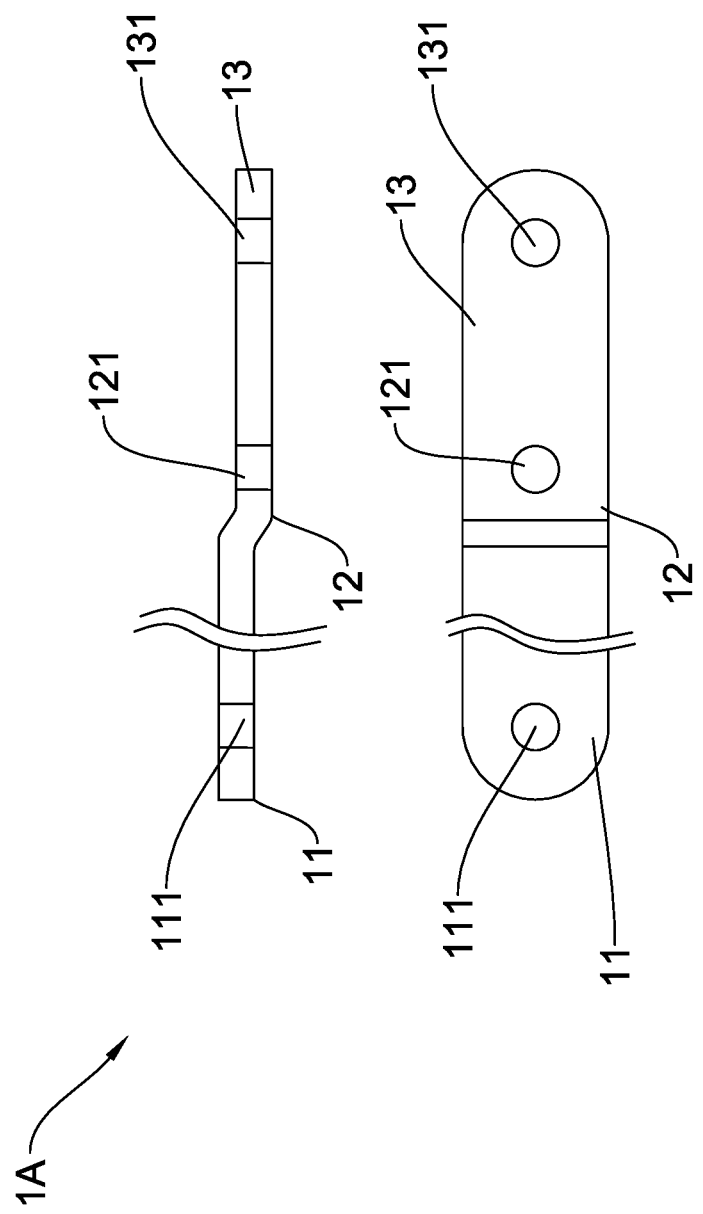
FIG. 5 shows the first half-finished product made by the method of the present invention.
Figure 6:
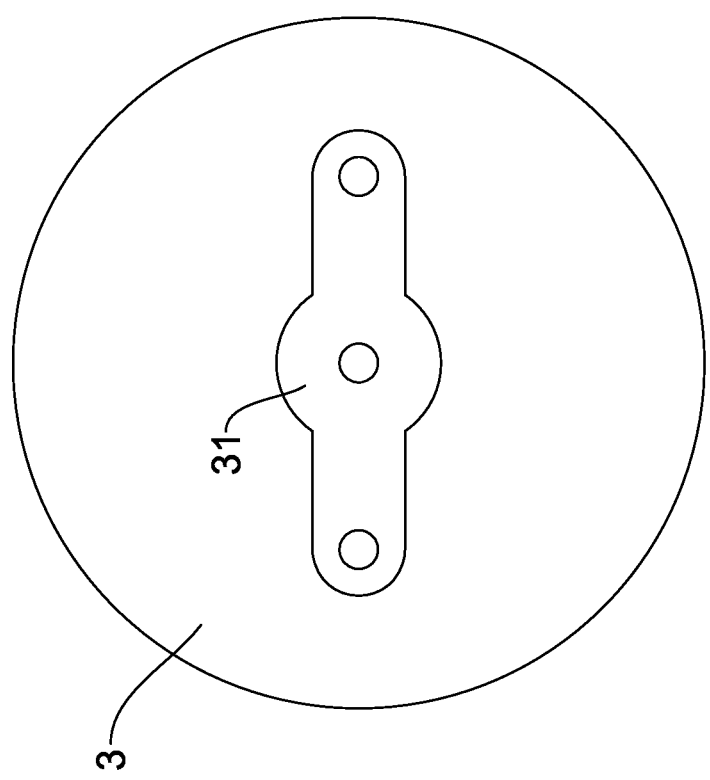
FIG. 6 shows the second stamping die used in the method of the present invention.
Figure 7:
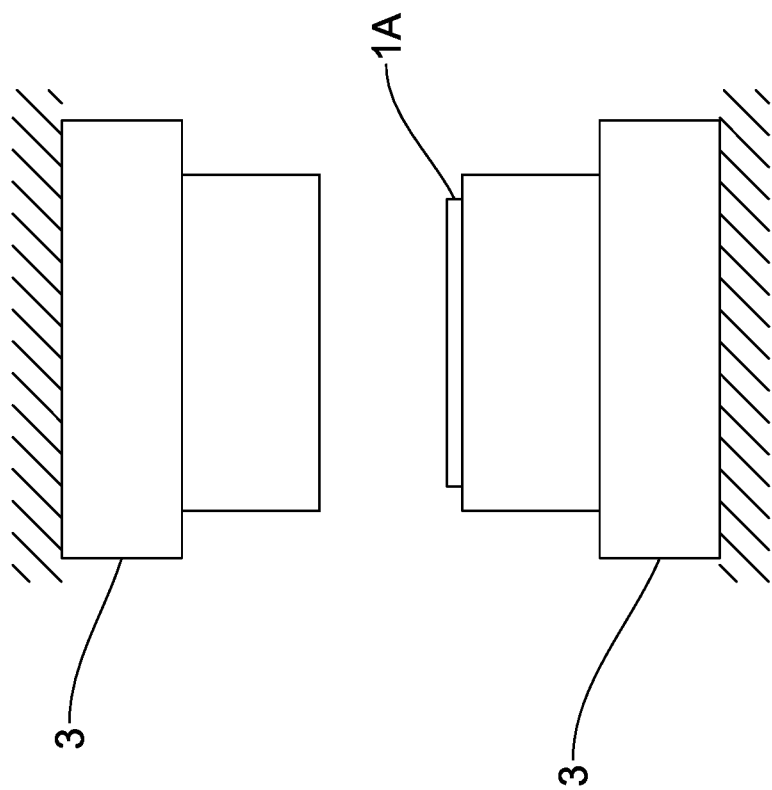
FIG. 7 shows the action of the step 3 of the method of the present invention.
Figure 9:
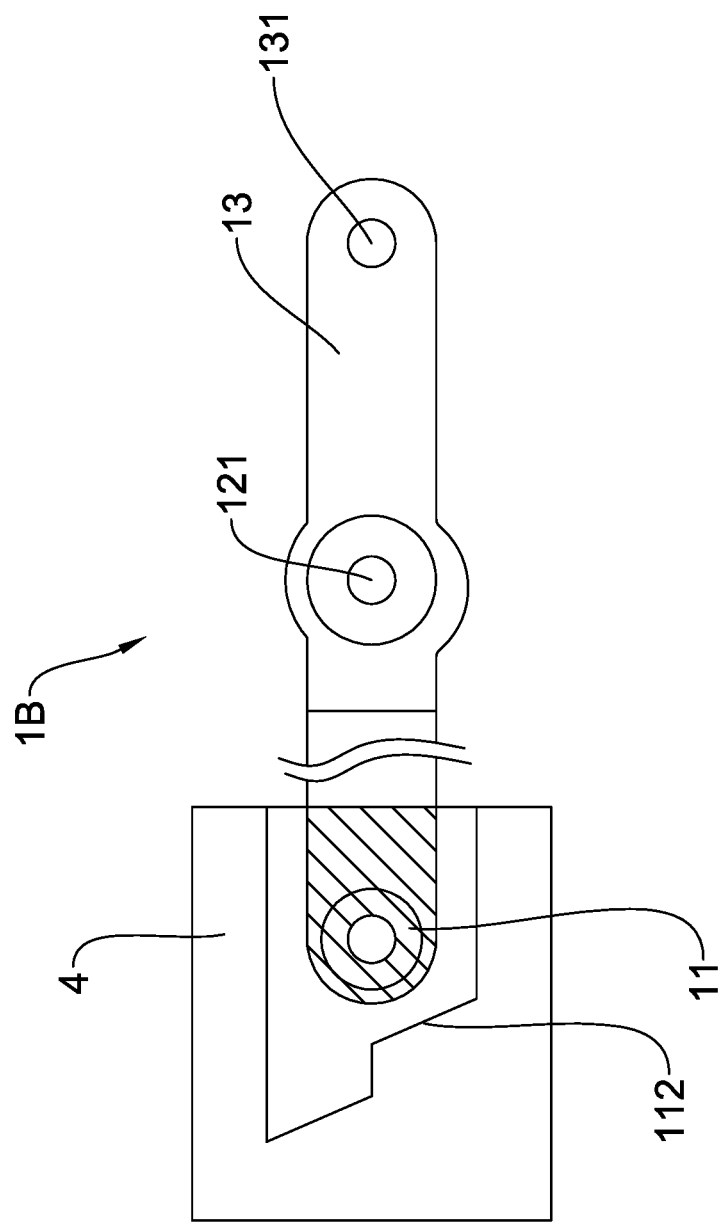
FIG. 9 shows the action of the step 4 of the method of the present invention
Figure 10:
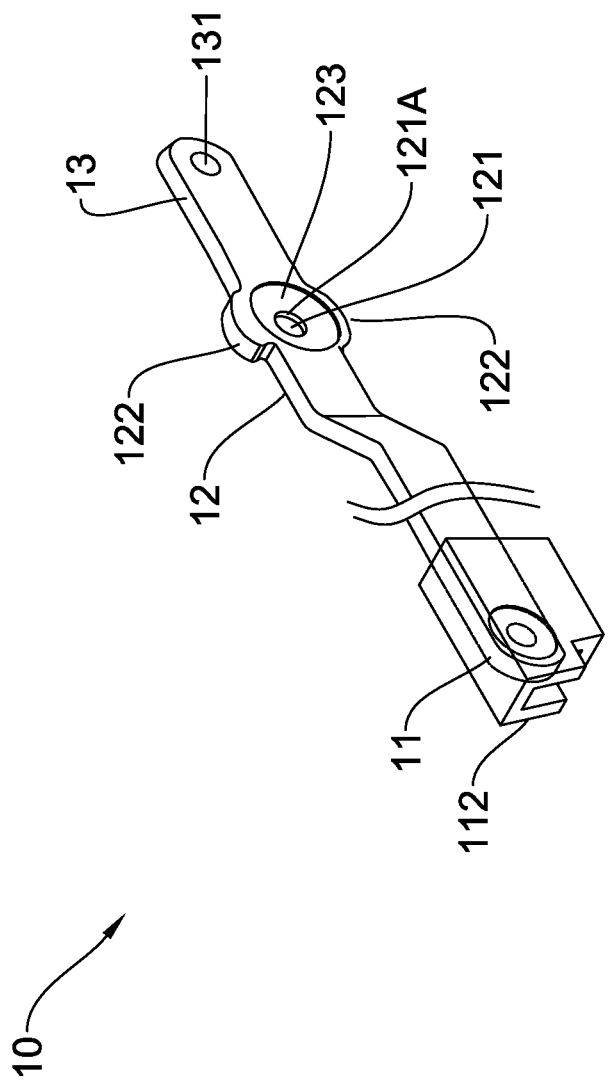
FIG. 10 is a perspective view to show the locking arm of the present invention.

Referring to FIG. 3, the method for manufacturing a locking arm 10 of a carrier connecting rod 100 comprises the following steps:

step S1: preparing a strip of metal sheet 1 which has a thickness between 0.6 to 1.3 cm.

step S2: placing the metal sheet 1 in a first stamping die 2. The first stamping die 2 presses the metal sheet 1 to form a first half-finished product 1A, as shown in FIGS. 3 to 5. The first half-finished product 1A includes a front section 11, a bent middle section 12 and a rear section 13. The front section 11 includes an aperture 111, the bent middle section 12 includes a positioning hole 121, and the rear section 13 includes a pivotal hole 131.

step S3: preparing a second stamping die 3 as shown in FIG. 6. The second stamping die 3 includes a circular groove 31 which is located corresponding to the bent middle section 12 as shown in FIG. 7. The first half-finished product 1A is placed in the second stamping die 3 and the first half-finished product 1A is pressed by the second stamping die 3 to form a second half-finished product 1B. As shown in FIGS. 8A and 8B, the bent middle section 12 is pressed by the circular groove 31 of the second stamping die 3 to form two arc-shaped portions 122 respectively protruding from the upper side and the lower side of the bent middle section 12. The two arc-shaped portions 122 reinforce the strength of the bent middle section 12. The bent middle section 12 is formed to include a recessed area 123 in one of two sides thereof, and the positioning hole 121 is centered formed to the recessed area 123. The inner periphery of the positioning hole 121 is formed to be a conical positioning hole 121A. The surplus material generated corresponding to the aperture 111, the positioning hole 121, and the pivotal hole 131 during the step S2 is then deburred.

step S4: placing the second half-finished product 1B into a plastic mold 4. As shown in FIG. 9, the plastic mold 4 injects plastic to cover the front section 11 and the aperture 111 to form an L-shaped stopper 112 to form the locking arm 10 as shown in FIG. 10.

Preferably, the second half-finished product 1B undergoes a surface treatment between the step S3 and the S4, such as anti-rusting or baking varnishing.

Preferably, in the step S2 or the step S3, the first stamping die 2 or the second stamping die 3 includes a part forming a guide surface 124 and the guide surface 124 is located opposite to the recessed area 123.

Figure 11:
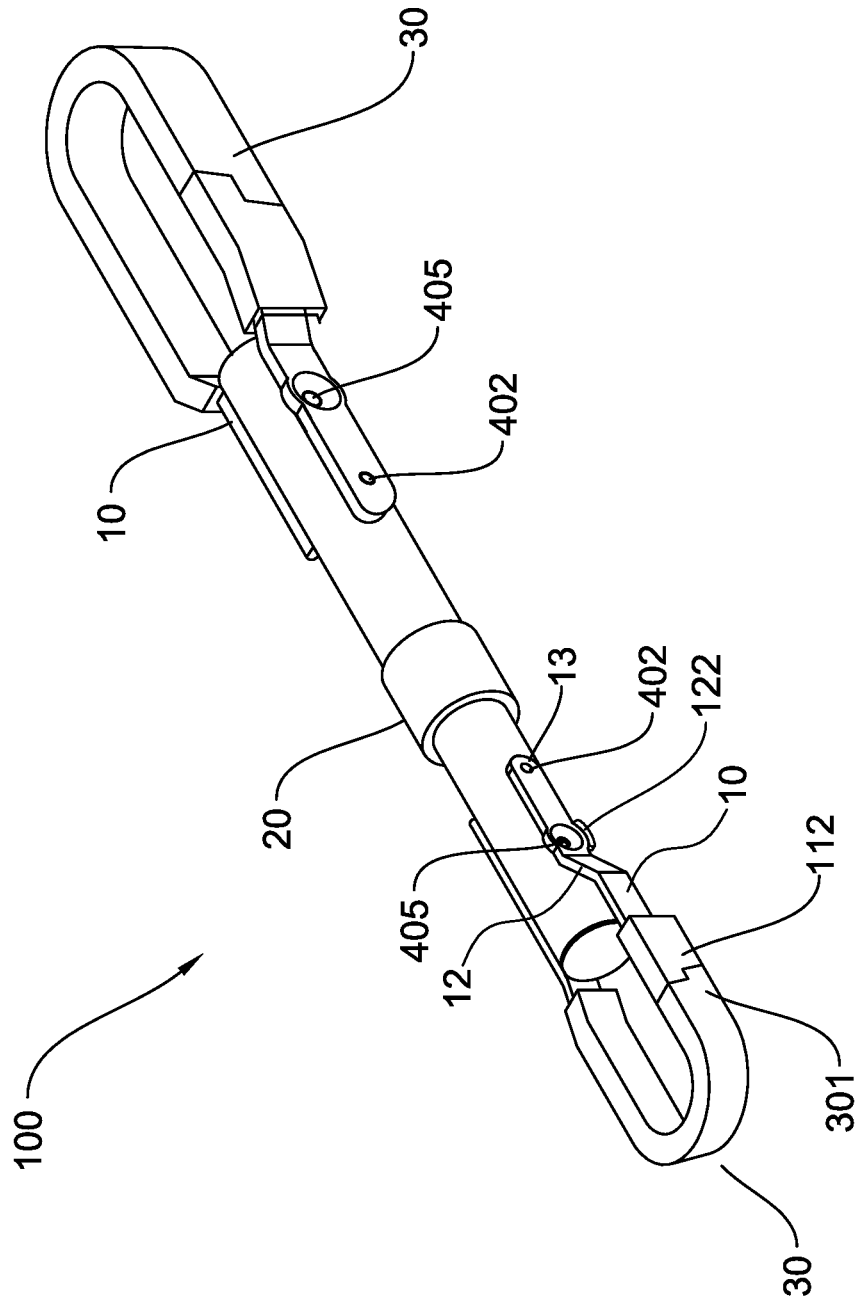
FIG. 11 shows a carrier connecting rod with the locking arms of the present invention installed thereto.
Figure 12:
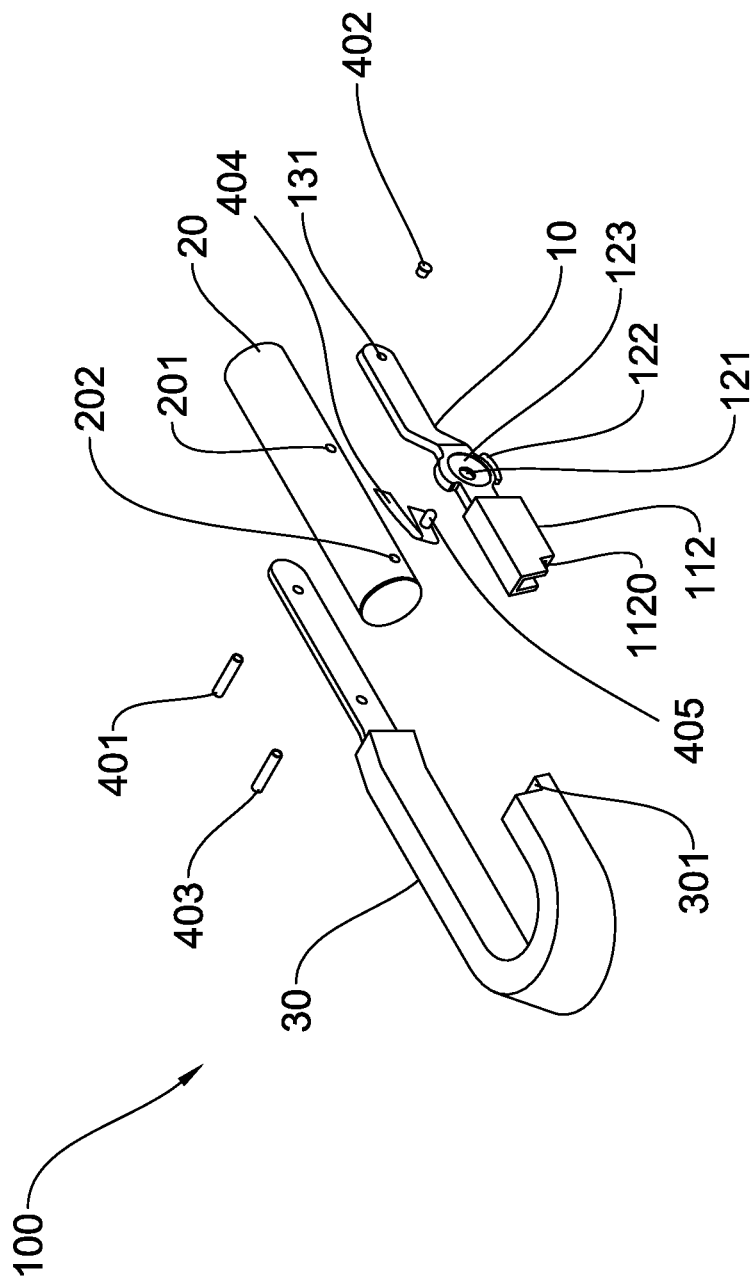
FIG. 12 is an exploded view to show the carrier connecting rod including the extendable tube, the spring member, the hooking plate and the locking arm of the present invention.

As shown in FIGS. 11 and 12, the carrier connecting rod 100 made by the method as described above is comprises two locking arms 10 each having a stopper 112 formed to the first end thereof, and the stopper 112 has a first matching section 1120. Each locking arm 10 includes a pivotal hole 131 defined in the second end thereof. A positioning hole 121 is defined through the bent middle section 12 of each locking arm 10, and the bent middle section 12 of each locking arm 10 includes a recessed area 123 formed to one of two sides thereof. The positioning hole 121 is located at the center of the recessed area 123. An extendable tube 20 has a first bore 201 and a second bore 202 defined through each of two end sections thereof.

Two hooking plates 30 are respectively fixed to two ends of the extendable tube 20 and each of the two hooking plates 30 has a hook end formed to the first end thereof. The hook end has a second matching section 301 formed to the distal end thereof so as to be matched with the first matching section 1120 of the stopper 112 of the locking arm 10 corresponding thereto as shown in FIG. 11. Each hooking plate 30 has a first pivot 401 extending through a second end thereof, and the first pivot 401 extends through the first bore 201 of the extendable tube 20, the pivotal hole 131 of the locking arm 10 and is connected to a coupling member 402 so that the hooking plate 30 is pivotable about the first pivot 401 relative to the extendable tube 20. Each hooking plate 30 has a second pivot 403 extending through the second end thereof to fix the hooking plate 30 to the extendable tube 20. As shown in FIGS. 8A and 8B, the locking arm 10 further has a guide surface 124 formed opposite to the pressing area 123.

A spring member 404 is located within each of the two ends of the extendable tube 20 and located corresponding to the two locking arms 10. Each spring member 404 includes a body plate and a bent section is formed with the body plate. The bent section includes a protrusion 405. The bent plate together with the protrusion 405 resiliently extend from the spring member 404. The protrusion 450 retractably extends through the second bore 202 of the extendable tube 20 and the positioning hole 121 of the locking arm 10. When the user pushes the protrusion 450 to be retracted from the positioning hole 121, the locking arm 10 is able to be pivoted upward about the first pivot 401 to disengage the first matching section 1120 of the stopper 112 from the second matching section 301 of the hook end of the hooking plate 30. When the head tube or the seat tube of a bicycle is hooked by the hooking plate 30, the locking arm 10 is pivoted downward until the protrusion 405 to be engaged with the positioning hole 121 again to position the carrier connecting rod 100. When the locking arm 10 is to be coupled with the protrusion 405, the protrusion 405 slides along the guide surface 124 to smoothly move the protrusion 405 to be engaged with the positioning hole 121.

The advantages and effects obtainable from the present invention are as follows:

1. The manufacturing method of the invention is mainly stamping, which results in a fast production speed for the locking arms 10. Specialized tools and fixtures are not required, leading to the benefits of cost reduction and increased production volume.
2. The present invention is capable of forming an arc-shaped protrusion 122 in the bent middle section 12 of the locking arm 10, primarily achieved through stamping. The arc-shaped protrusion 122 reinforces the strength of the bent middle section 12. There is no need to reserve excess material in the metal sheet 1, thereby reducing material costs.
3. The carrier connecting rod 100 produced by the method of the present invention has high strength and is less prone to fractures.

While we have shown and described the embodiment in accordance with the present invention, it should be clear to those skilled in the art that further embodiments may be made without departing from the scope of the present invention.

What is claimed is:

1. A method for manufacturing a locking arm of a carrier connecting rod comprising the following steps:
   step S1: preparing a strip of metal sheet;
   step S2: placing the metal sheet in a first stamping die which presses the metal sheet to form a first half-finished product, the first half-finished product including a front section, a bent middle section, and a rear section, the front section having an aperture, the bent middle section having a positioning hole, and the rear section having a pivotal hole;
   step S3: preparing a second stamping die, the second stamping die having a circular groove which is located corresponding to the bent middle section, placing the first half-finished product in the second stamping die and pressing the first half-finished product to form a second half-finished product, the bent middle section being pressed through the circular groove of the second stamping die to form two arc-shaped portions respectively protruding from an upper side and a lower side of the bent middle section, the bent middle section being formed to include a recessed area, the positioning hole being centered formed to the recessed area, an inner periphery of the positioning hole being formed to be a conical positioning hole, a surplus material generated corresponding to the aperture, the positioning hole, and the pivotal hole during the step S2 being deburred, and
   step S4: placing the second half-finished product into a plastic mold, injecting plastic to cover the front section and the aperture to form an L-shaped stopper, resulting in the locking arm.

2. The method for manufacturing the locking arm of a carrier connecting rod as claimed in claim 1, wherein the second half-finished product undergoes a surface treatment between the step S3 and the step S4.

3. The method for manufacturing the locking arm of a carrier connecting rod as claimed in claim 1, wherein in the step S2 or the step S3, the first stamping die or the second stamping die includes a part forming a guide surface, the guide surface is located opposite to the recessed area.

\* \* \* \* \*